Dec. 8, 1964 R. C. THORNTON 3,159,879
FIXTURE FOR USE IN THE MANUFACTURE OF HEAT EXCHANGERS
Filed Oct. 7, 1963
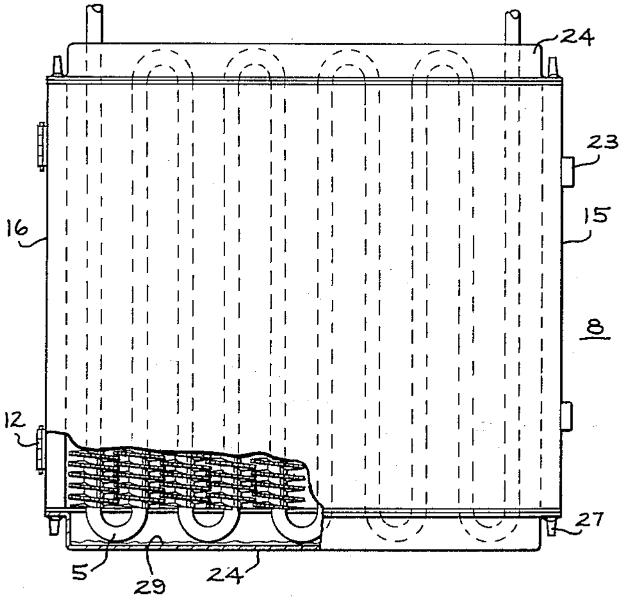
FIG. 1
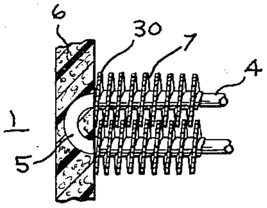
FIG. 2
FIG. 3
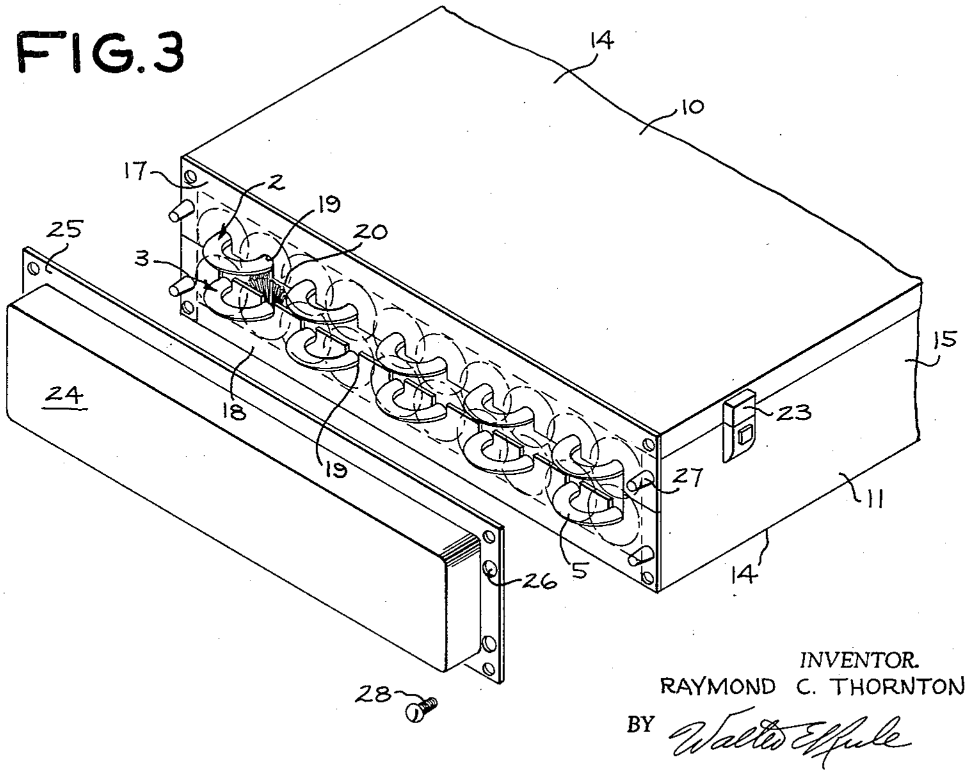
INVENTOR.
RAYMOND C. THORNTON
BY Walter E. Fuhle
HIS ATTORNEY 3,159,879
Patented Dec. 8, 1964

3,159,879

FIXTURE FOR USE IN THE MANUFACTURE OF HEAT EXCHANGERS

Raymond C. Thornton, Jeffersontown, Ky., assignor to General Electric Company, a corporation of New York
Filed Oct. 7, 1963, Ser. No. 314,420
1 Claim. (Cl. 18—36)

The present invention relates to the manufacture of heat exchangers and is more particularly concerned with a fixture for use in the manufacture of a heat exchanger comprising a plurality of passes connected by end turns and in which the end turns are encapsulated in a supporting body of foamed plastic material.

Heat exchangers of the type employed in refrigeration systems frequently comprise a refrigerant conduit including a plurality of tubular passes connected by tubular U-shaped end turns. To improve the heat transfer between the refrigerant and the air passed over the heat exchanger, the passes are provided with fins extending over a substantial portion of the passes, and the passes are held in their desired spaced relationship by means of metal end sheets. In the copending application Serial No. 314,246 filed concurrently herewith in the names of Raymond C. Thornton and Roy W. Abbott and assigned to the same assignee as the present invention, there is described and claimed an improved heat exchanger in which the end turns are embedded in and supported by blocks or bodies of foamed plastic material which serve not only to support the passes in spaced relationship but also serve to insulate the end turns.

The present invention has as its principal object the provision of a fixture for use in the manufacture of such heat exchangers which fixture is of simple and low cost construction and is designed both to position the passes prior to the foaming of the foamed plastic end blocks and to protect the fin portions or sections during the foaming operation.

In accordance with the illustrated embodiment of the invention, the fixture comprises opposed confronting members which are pivotally connected along adjacent side edges thereof to form an enclosure for containing and protecting the finned portions of the heat exchanger. The end walls of at least one of the members includes means for spacing the heat exchanger passes in their proper relationship prior to the foaming operation with the U-turns or return bends extending outside of the housing defined by the two members. A tray-shaped member adapted to be removably mounted on one or both end walls is adapted to cooperate with the end wall on which it is mounted to form a mold enclosing the end turns so that, during expansion thereof, a foamable plastic material introduced into the mold will completely fill the mold and embed or encapsulate the end turns.

Additional features and advantages of the present invention will become apparent from the following detailed description thereof and with reference to the accompanying drawing in which:

FIGURE 1 is a plan view, partly in section, of the fixture of the present invention;

FIGURE 2 is a sectional view of a portion of a heat exchanger manufactured in accordance with the present invention; and FIGURE 3 is a perspective view of a portion of the fixture illustrated in FIGURE 1 illustrating one step in the use thereof for the manufacture of a heat exchanger.

The fixture of the present invention will be specifically described with reference to the manufacture of a heat exchanger generally indicated by the numeral 1 in the accompanying drawing and comprising spaced parallel sections 2 and 3 each of which includes a conduit including a plurality of parallel tubular passages 4 connected by U-shaped end turns 5. The end turns 5 at opposite ends of the heat exchanger are supported by and embedded in end sheets or blocks of foamed plastic material 6. The passes 4 are provided with heat transfer fins 7 extending substantially the full lengths thereof.

As the foamed plastic material 6 provides the sole means for supporting the passes in their desired spaced relationship, it is necessary to provide some means for properly positioning the passes during the formation of the foamed plastic end blocks 6.

The fixtures 8 of the present invention designed for this purpose comprises opposed confronting members 10 and 11 defining a housing for containing the finned portions of the heat exchanger 1. These two members 10 and 11 may be pivotally connected along adjacent side edges thereof by means of hinges 12.

More specifically each of these confronting members 10 and 11 are of generally box-shaped configuration comprising top and bottom walls 14, opposed side walls 15 and 16 and opposed end walls 17 and 18 which are spaced a sufficient distance apart to receive the finned sections 7 of the heat exchanger. The illustrated fixture is designed for use in the manufacture of a heat exchanger comprising the two sections 2 and 3 and in order to maintain the various passes 4 of these two sections in their proper spaced positions during the formation of the foamed plastic end blocks 6, the opposed end walls 17 and 18 of the respective members 10 and 11 are both provided with slots 19 for receiving the passes 4 whereby the finger portions 20 between the slots 19 position the various passes 4 in the desired spaced relationship. Specifically, the slots 19 on the end wall 17 forming part of the member 10 receives the various passes of the heat exchanger section 2 while the similar slots 19 of the member 11 receives the passes of the section 3.

After the heat exchanger is properly positioned within the slots 19 so that the various passes are properly spaced with respect to each other by means of the fingers 20, the two members 10 and 11 may be secured together to form a closed housing by means of one or more catches or latches 23 whereby the finned portions of the heat exchanger are securely and completely enclosed within the housing defined by the members 10 and 11 with only the return bends 5 extending outwardly from the housing at the opposite ends thereof. The fins are thereby completely protected by the housing during subsequent handling of the heat exchanger during the embedding of the end turns 5 in a foamed plastic insulating material.

For the purpose of molding a body of foamed plastic material 6 about the end turns 5, there is provided a tray-shaped member 24 having peripheral flanges 25 adapted to engage the peripheral edges of the end walls 17 and 18 at each end of the fixture housing. For the purpose of positioning the tray 24 on the end walls 17 and 18, the flange 25 may be provided with one or more openings 26 adapted to be received on locating pins 27 on the end walls 17 and 18. When the tray-shaped member 24 is so mounted, the tray and the end walls 17 and 18 form a substantially closed mold. If desired one or more fastening means such as the screws 28 may be employed to temporarily fasten the mold member 24 to the fixture housing during the foaming operation.

In the use of the mold members 24 to form an end block, a small amount of foamable resinous material 29 is introduced into the member 24 as shown in FIGURE 1 of the drawing and while the member 24 is in an upright position it is secured to one of the end walls of the housing using the holes 26 and locating pins 27 to properly position these two components. The foamable plastic material 29 is then allowed to foam and to completely fill the cavity defined by the member 24 and the end walls 17 and 18. As the foamable material sets to a solid or rigid foamed plastic it completely embeds and encapsulates the end turns 5 but is substantially prevented from entering the interior of the housing by means of the fingers 20 and the end fins 30 which are closely adjacent the fingers 20. After a predetermined curing time has elapsed for a proper setting of the foamed plastic material, the mold member 24 can be removed from one end and it or a second mold member is then employed to form the end turns at the other end of the heat exchanger. After the second end block is formed, the mold and housing are removed and there is provided a completed heat exchanger in which the end turns are supported by the foamed plastic material. During the entire operation the fins are protected from damage by means of the housing formed by the members 10 and 11.

While there has been shown and described a particular embodiment of the present invention, it is to be understood that it is not limited thereto and it is intended by the appended claim to cover all such modifications as fall within the true spirit and scope of the invention.

What I claim as new and desire to secure by Letters Patent of the United States is:

A fixture for use in the manufacture of a heat exchanger comprising spaced parallel sections each including a plurality of parallel tubular passes having fin portions thereon and connected by U-shaped end turns embedded in a foamed plastic material, said fixture comprising opposed confronting members each adapted to contain one of said sections, said members being pivotally connected along adjacent side edges thereof, each of said members comprising end walls spaced from one another a distance approximately equal to the lengths of said fin portions thereby to receive the finned portions of said passes between said end walls, the opposed edges of the end walls on each of said members being spaced from the opposed edges of said end walls on the other of said members, each of said opposed edges having slots therein for receiving said passes adjacent said finned sections, and a mold adapted to be removably secured to an end of said fixture for enclosing the end turns at said end of said fixture.

References Cited in the file of this patent

UNITED STATES PATENTS

| | | |
|---|---|---|
| 1,161,193 | Cools | Nov. 23, 1915 |
| 2,120,502 | Morton | June 14, 1938 |
| 2,303,416 | Woods | Dec. 1, 1942 |
| 2,954,597 | McFarland | Oct. 4, 1960 |
| 3,070,844 | Warnken | Jan. 1, 1963 |